United States Patent [19]

Hayashi

[11] Patent Number: 5,670,933
[45] Date of Patent: Sep. 23, 1997

[54] ANTITHEFT APPARATUS AND METHOD FOR AN AUTOMOBILE

[75] Inventor: Kazuhiko Hayashi, Aichi-gun, Japan

[73] Assignee: Toyota Jidosha Kabushiki Kaisha, Toyota, Japan

[21] Appl. No.: 492,979

[22] Filed: Jun. 21, 1995

[30] Foreign Application Priority Data

Jul. 14, 1994 [JP] Japan .................... 6-162143

[51] Int. Cl.$^6$ .................................. B60R 25/10
[52] U.S. Cl. ............... 340/426; 340/428; 340/825.31; 340/825.32; 340/825.34; 307/10.2; 307/10.3; 116/33
[58] Field of Search .................. 340/426, 428, 340/429, 430, 825.31, 825.32, 825.34; 307/10.2–10.6; 116/33

[56] References Cited

U.S. PATENT DOCUMENTS

| | | | |
|---|---|---|---|
| 3,906,447 | 9/1975 | Crafton .................... | 235/382.5 |
| 4,652,860 | 3/1987 | Weishaupt et al. ........ | 340/426 |
| 4,758,835 | 7/1988 | Rathmann et al. ........ | 340/825.31 |
| 5,041,810 | 8/1991 | Gotanda .................... | 340/426 |
| 5,055,701 | 10/1991 | Takeuchi .................. | 307/10.2 |
| 5,079,435 | 1/1992 | Tanaka ..................... | 307/10.2 |
| 5,365,225 | 11/1994 | Bachhuber ................ | 340/825.31 |
| 5,369,706 | 11/1994 | Latka ....................... | 380/23 |
| 5,377,270 | 12/1994 | Koopman, Jr. et al. .... | 380/25 |
| 5,519,376 | 5/1996 | Iijima ....................... | 340/426 |
| 5,600,723 | 2/1997 | Woodall et al. ........... | 380/23 |

FOREIGN PATENT DOCUMENTS

| | | |
|---|---|---|
| 354-102-A | 2/1990 | European Pat. Off. . |
| 492-692-A | 7/1992 | European Pat. Off. . |
| 2-251-503 | 7/1992 | United Kingdom . |
| WO 93/05987 | 4/1993 | WIPO . |

Primary Examiner—Jeffery Hofsass
Assistant Examiner—Ashok Mannaua
Attorney, Agent, or Firm—Oliff & Berridge

[57] ABSTRACT

If agreement between an identification code transmitted from a transmitter 111 installed in a door key 11 and a predetermined identification code is detected in an immobilizing ECU 12, a variable code including a predetermined key word is transmitted from the immobilizing ECU 12 to an engine ECU 13, and the variable code is decoded in the engine ECU 13. If the decoded key word does not agree with the predetermined key word, the starting of the engine is inhibited.

According to another aspect of this invention, a variable code is transmitted from the engine ECU 13 to the immobilizing ECU 12, a returning variable code is calculated based on a predetermined key function in the immobilizing ECU 12, and it returns to the engine ECU 13. If an agreement with returned variable code and a reference variable code determined in the engine ECU 13 is detected for the predetermined period, the starting of the engine is inhibited.

16 Claims, 17 Drawing Sheets

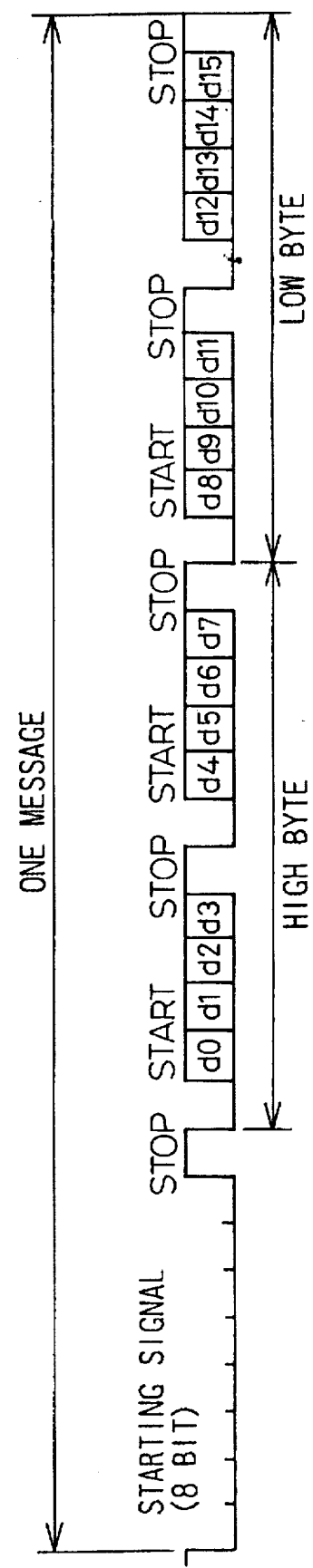

ANTITHEFT APPARATUS AND METHOD FOR AN AUTOMOBILE

BACKGROUND OF THE INVENTION

1. Field of the Invention

The present invention relates to an antitheft apparatus and method for an automobile, especially to an antitheft apparatus and method for an automobile which has an improved antitheft capability.

2. Description of the Related Arts

Recently, almost all automobiles are provided with a keyless-entry system which can lock or release the doors from the outside using a transmitter which is installed in a door key and transmits a predetermined identification code.

Theft of the automobile, however, cannot be avoided when a door is destructively opened.

To solve the above-mentioned problem, a keyless-entry system with an improved antitheft capability which interrupts the starting circuit of an engine when the door is locked, has already been proposed (refer to Unexamined Panted Application (Kokai) No. 63-31847).

The keyless-entry system according to the above-mentioned application has a remote control key combined with an ignition key, and interrupts the starting circuit when the ignition lock is positioned at the locked position and the door is locked by the remote control key.

The starting circuit is connected when the door is opened by the remote control key.

The antitheft possibility, therefore, is improved, because the engine cannot be started if the door is opened using means other than the remote control key.

The identification code, however, in the remote control key must be small, and the transmitter installed in the key has the limited size.

Therefore, the antitheft possibility cannot be sufficiently improved, because the code can be easily decoded.

SUMMARY OF THE INVENTION

It is an object of the present invention to provide an antitheft apparatus and method for an automobile which has an improved antitheft capability due to an immobilizer system which inhibits the fuel supply to the engine or the ignition of the engine.

An antitheft apparatus, for an automobile according to the present invention, comprises an identification code transmitting means which is installed in a transmitter for transmitting a predetermined identification code; an immobilizing means for transmitting a variable code which is comprised of plural blocks, each block thereof having plural bits, at least one block thereof being generated at random when electricity is supplied to the automobile, and the other blocks thereof are determined as a predetermined function of said at least one block and a predetermined key word, if the code transmitted from said identification code transmitting means agrees with the predetermined identification code for a predetermined period after the automobile is powered; and a start inhibiting means for inhibiting the starting of an engine if agreement between a word which is decoded from the variable code transmitted from said immobilizing means and said predetermined key word is not detected for a predetermined period after electricity is supplied to the automobile.

An antitheft method for an automobile according to the present invention, comprises the steps of transmitting a predetermined identification code; transmitting a variable code which is comprised of a plurality of blocks, each block thereof having plural bits, at least one block thereof being generated at random when the automobile is powered and the other blocks thereof are determined as a predetermined function of said at least one block and a predetermined key word, if the transmitted identification code agrees with the predetermined identification code for a predetermined period after electricity is supplied to the automobile; and inhibiting the starting of an engine if agreement between a word which is decoded from the transmitted variable code and said predetermined key word is not detected for a predetermined period after the automobile is powered.

According to this antitheft apparatus and method, a variable code including a predetermined key word is transmitted from the immobilizing means to the inhibiting means when a code transmitted from the identification code transmitting means agrees with the predetermined identification code, and the starting of an engine is inhibited when the key word is not decoded in the inhibiting means.

Another antitheft apparatus for an automobile, according to the present invention, comprises an identification code transmitting means which is installed in a transmitter for transmitting a predetermined identification code; a variable code transmitting means for transmitting a variable code which is comprises plural blocks, each block thereof having plural bits and being generated at random when electricity is supplied to the automobile and reaches to the predetermined operating condition, and calculating a reference code which is determined as a predetermined function of said plural blocks of said variable code; an immobilizing means for transmitting a returning code which is calculated as a predetermined key function of said plural blocks of said variable code, if the code transmitted from said identification code transmitting means agrees with the predetermined identification code; and a start inhibiting means for inhibiting the starting of an engine if it is not detected for a predetermined period, after electricity is supplied to the automobile, that said returning code transmitted from said immobilizing means agrees with said reference code determined in said variable code transmitting means.

Another antitheft method for an automobile according to the present invention, comprises the steps of transmitting a predetermined identification code; transmitting a variable code which is comprised of plural blocks, each block thereof has plural bits and is generated at random when electricity is supplied to the automobile and reaches a predetermined operating condition, and calculating a reference code which is determined as a predetermined function of said plural blocks of said variable code; transmitting a returning code which is calculated as a predetermined key function of said plural blocks of said variable code, if the code transmitted from said identification code transmitting means agrees with the predetermined identification code; and inhibiting the starting of an engine if it is not detected for a predetermined period after electricity is supplied to the automobile that said returning code transmitted from said immobilizing means agrees with said reference code determined in said variable code transmitting means.

According to the second antitheft apparatus and method, a variable code is transmitted from the variable code transmitting means to the immobilizing means, and a returning code is calculated based on a predetermined key function in immobilizing means. The inhibiting means inhibits the supply of fuel to the engine or the ignition circuit to the engine if it is not detected that the returning code agrees with a reference code calculated in the variable code transmitting means for the predetermined period.

BRIEF DESCRIPTION OF THE DRAWINGS

The present invention will be more clearly understood from the description as set forth below with reference to the accompanying drawings, wherein:

FIG. 18 is a frame structure of a communication message.

DESCRIPTION OF THE PREFERRED EMBODIMENT

Figure 1:
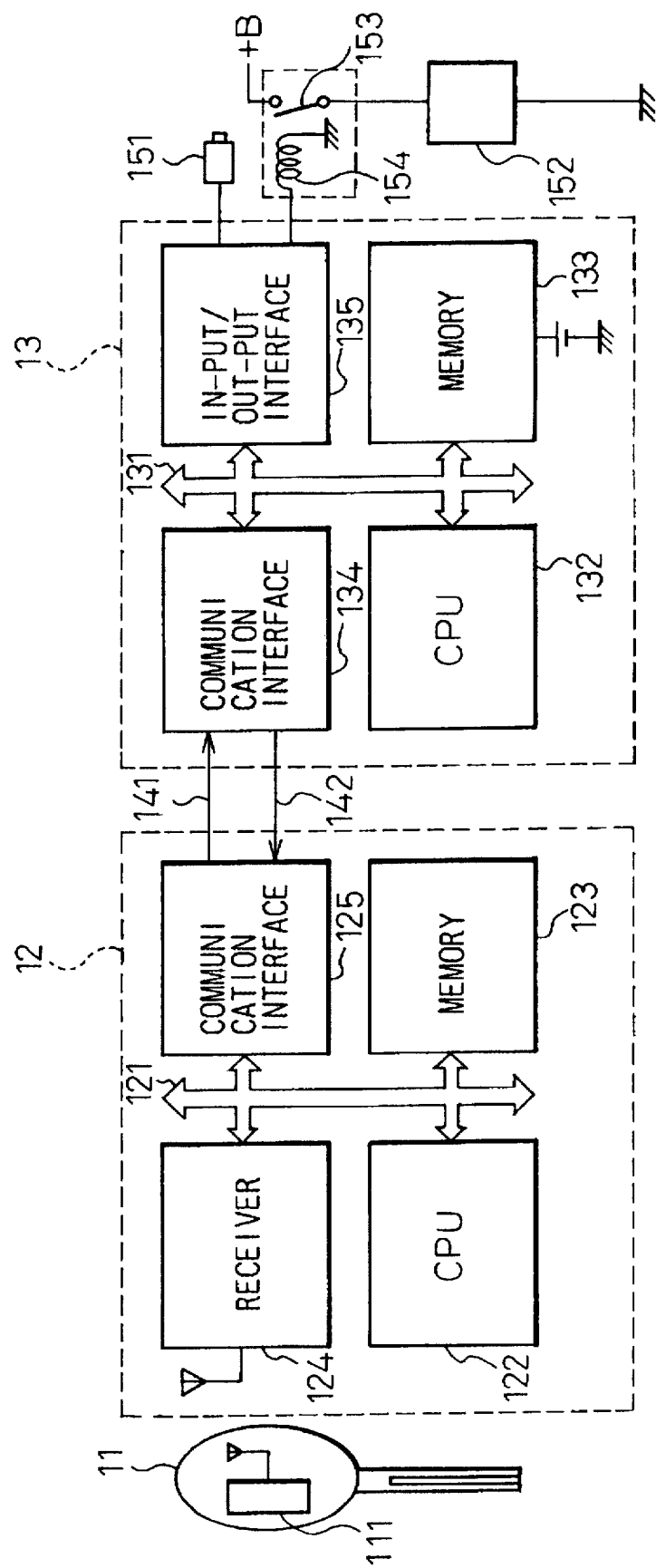
FIG. 1 is a hardware structure of an antitheft apparatus for an automobile.

FIG. 1 is a hardware structure of an antitheft apparatus for an automobile, and it is comprised of an ignition key 11, an immobilizer ECU (Electronic Control Unit) 12 and an engine ECU 13.

A transmitter 111 which transmits an identification code ID is installed in the door key 11.

The immobilizer ECU 12 is a microcomputer system comprised of a bus 121, CPU 122, a memory 123, a receiver 124 which receives the identification code ID and a communication interface 125, and installed in the automobile.

The engine ECU 13 is a microcomputer system comprised of a bus 131, CPU 132, a memory 133, a communication interface 134 and an input/output interface 135, and also installed in the automobile.

Note, the memory 133 is backed up by a battery (not shown).

A serial transmission line 141 is connected between the communication interface 125 of the immobilizer ECU 12 which functions as a transmitter and the communication interface 134 of the engine ECU 13 which functions as a receiver.

A speed sensor 151 which detects an engine speed and an exciton coil 154 for a relay 153 which interrupts the power to a fuel-supply system or an ignition system 152 are connected to the input/output interface 135 of the engine ECU 13.

Note, the engine ECU 13 may include the function to control fuel-injection or ignition.

Figure 2:
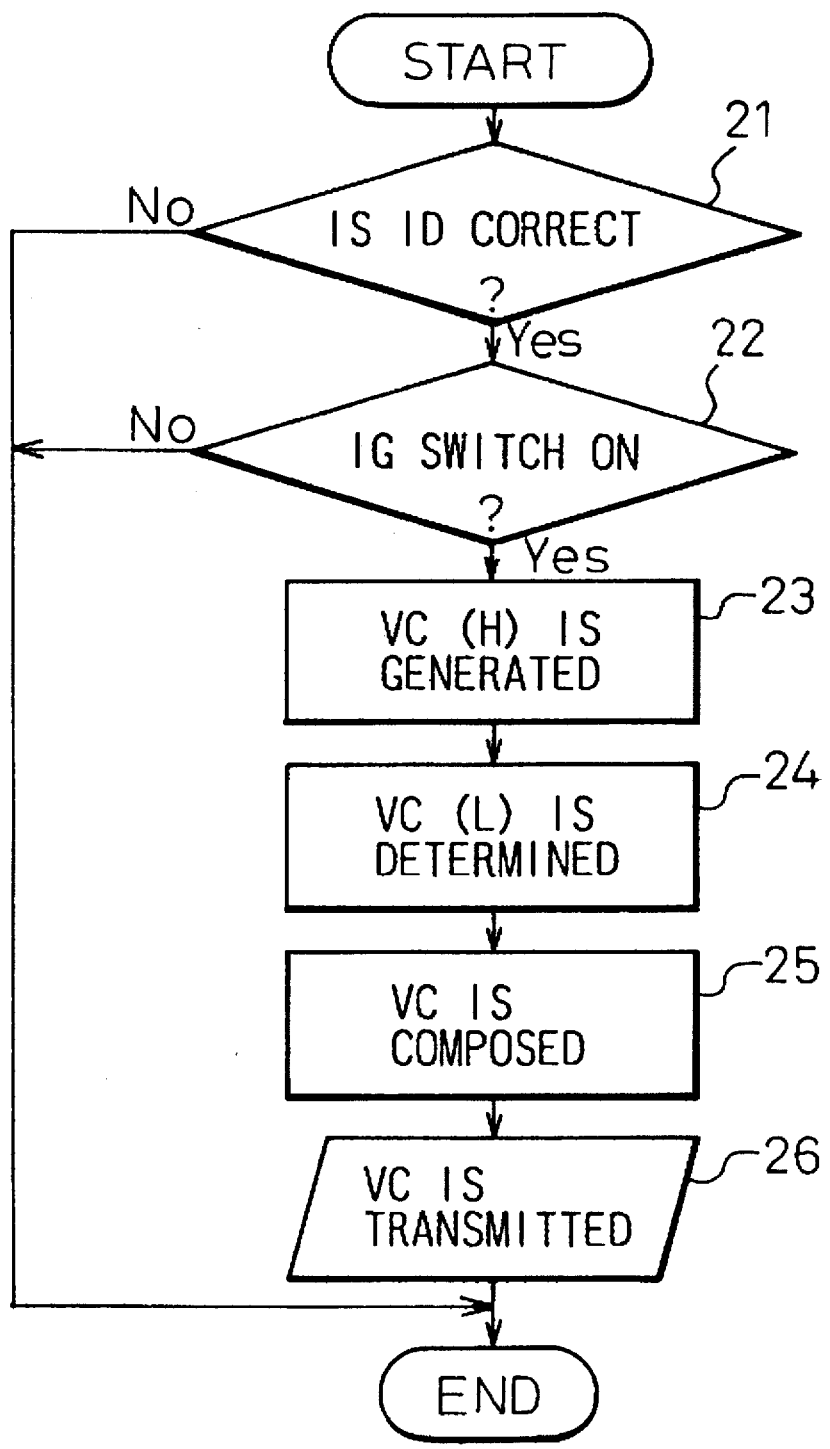
FIG. 2 is a flowchart of a variable code transmitting routine executed in an immobilizer ECU.

FIG. 2 is a flowchart of a variable code transmitting routine executed every predetermined interval in the immobilizer ECU 12 of the antitheft apparatus.

At step 21, it is determined whether or not the transmitted code ID which is transmitted from the transmitter 111 installed in the door key 11 agrees with the predetermined identification code.

If the determination at step 21 is negative, the control is directly terminated.

If the determination at step 21 is affirmative, the control proceeds to step 22, where it is determined whether or not an ignition switch is turned on.

If the determination at step 22 is negative, the control is directly terminated.

If the determination at step 22 is affirmative, the control proceeds to step 23, where a two digits number VC(H) is generated at random by using a free running counter.

At step 24, a two digits number VC(L) is determined as a predetermined function of the two digits number VC(H) and a two digits key word KW.

At step 25, a variable code VC is composed of the number VC(H) as the high byte, and the number VC(L) as the low byte.

For example, the number VC(H) generated at random at step 22 may be "01 (hexadecimal number)".

If the key word KW is "80 (hexadecimal number)", the predetermined function is a subtraction, a minuend thereof is the key word KW, and a subtrahend thereof is the number VC(H), the number VC(L) is calculated from the following equation.

$$VC(L)=80-01=7F$$

Therefore, a transmitting variable code VC determined at step 25 is determined as the following.

$$VC=017F$$

At step 26, the transmitting variable code VC is transmitted through the communication interface 125 and the serial transmission line 141, and the routine is terminated.

Figure 3:
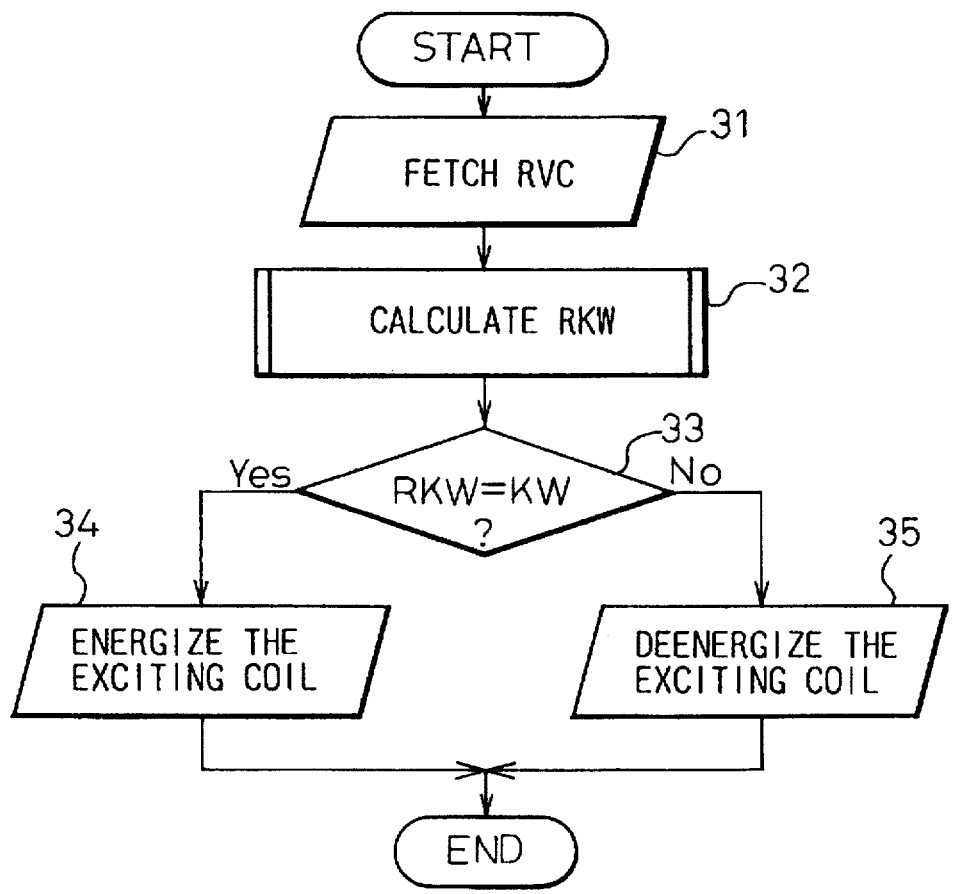
FIG. 3 is a flowchart of a start inhibiting routine executed in an engine ECU.

FIG. 3 is a flowchart of a start inhibiting routine executed every predetermined interval in the engine ECU 13 of the antitheft apparatus.

At step 31, a received variable code is fetched in the engine ECU 13 through the communication interface 134.

At step 32, the received key word RKW is calculated, and the control proceeds to step 33.

At step 33, it is determined whether or not the received key word RKW agrees with the predetermined key word KW.

If the determination at step 33 is affirmative, the control proceeds to step 34, where the exciton coil 154 of the relay 153 is energized, and the routine is terminated.

When the exciting coil 154 of the relay 153 is energized, the relay 153 is set to on, and the fuel-supply system 152 is powered to allow starting of the engine.

If the determination at step 33 is negative, the control proceeds to step 35, where the exciton coil 154 of the relay 153 is deenergized, and the routine is terminated.

Therefore, the power to the fuel-supply system 152 is interrupted to inhibit starting of the engine.

Figure 4:
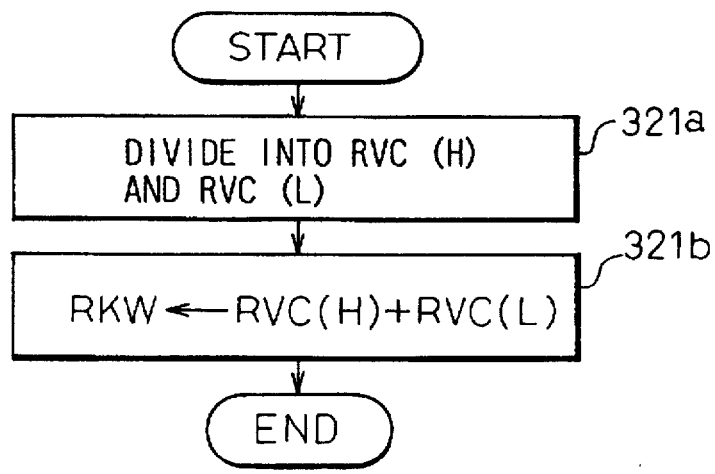
FIG. 4 is a flowchart of the first key word decoding routine.

FIG. 4 is a detailed flowchart of the first received key word calculating routine executed at step 32 of the start inhibiting routine, and the received variable code is divided between a high byte RVC(H) and a low byte RVC(L) at step 321a.

At step 321b, the received key word RKW is calculated as the inverse function of the predetermined function, i.e., the addition of the high byte RVC(H) and the low byte RVC(L).

$$RKW=RVC(H)+RCV(L)$$

According to the first embodiment, the immobilizer ECU and the engine ECU are powered when the ignition switch is turned to on, and the immobilizer ECU generates a variable code based on the predetermined key word and transmits it to the engine ECU if a predetermined identification code is transmitted from the transmitter installed in the key. The engine ECU decodes the variable code, and allows the engine to start if the predetermined key word is detected.

The variable code, however, is not renewed as long as the electric power to the automobile is not interrupted, that is, until the ignition switch is turned off.

Therefore, the first embodiment has a weak point, that is, it allows to start the engine, because the key word can be decoded if the starting of the engine, that is, the starting of a starter is repeated without turning off of the ignition switch.

The second embodiment has a function of inhibiting to start the engine if a variable code received at the latest turn on of the ignition switch agrees with the variable code received at the previous turn on of the ignition switch in order to solve the above-mentioned problem.

Figure 5:
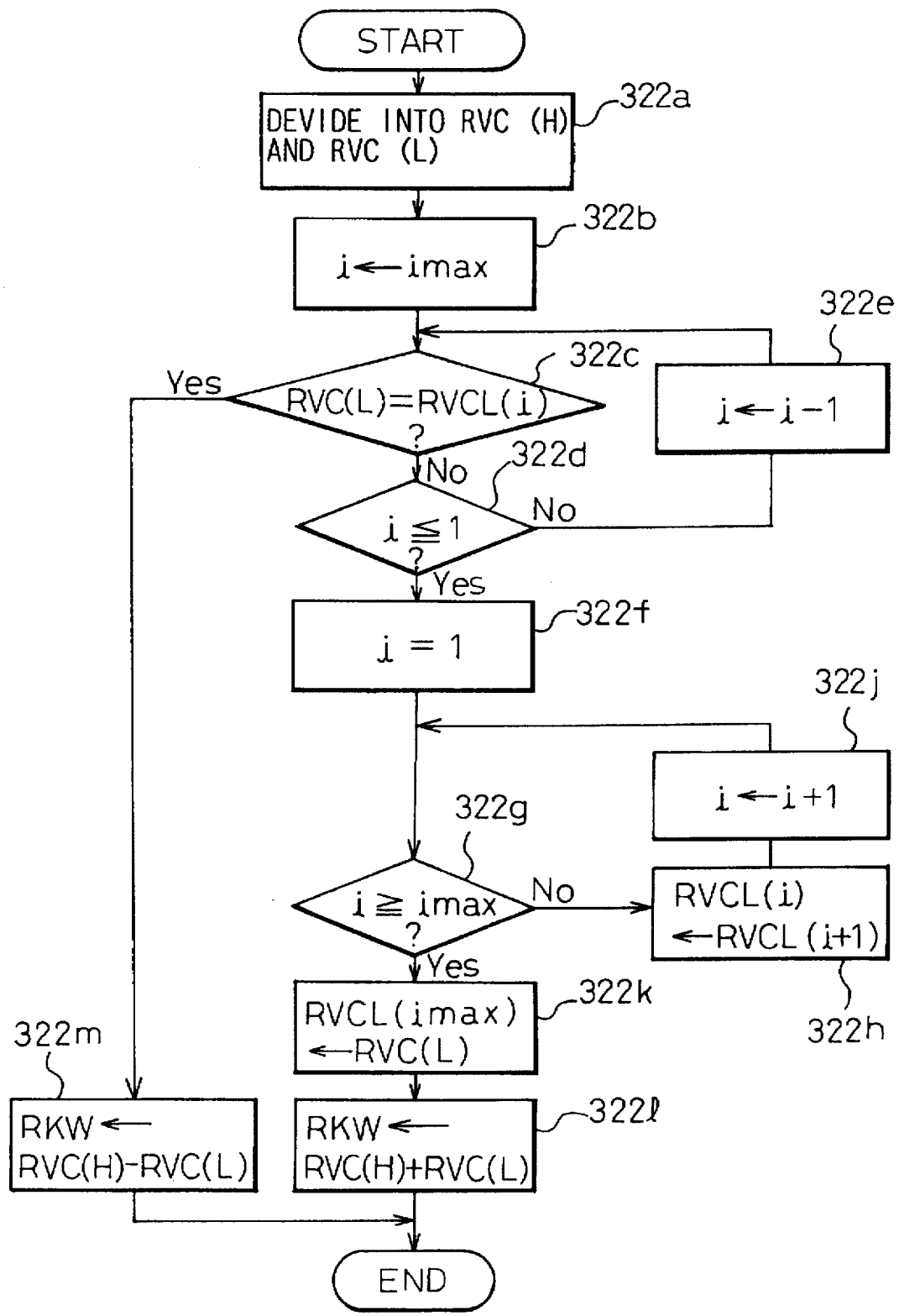
FIG. 5 is a flowchart of the second key word decoding routine.

FIG. 5 is the detailed flowchart of the second received key word processing routine where the duplicate key word is rejected.

At step 322a, the received variable code is divided into the high byte RVC(H) and the low byte RVC(L).

At step 322b, an index i which denotes the number of the variable codes to be examined, is set to the maximum number "$i_{max}$".

At step 322c, it is determined whether or not the latest low byte RVC(L) agrees with one of the previous ones.

If the determination at step 322c is negative, the control proceeds to step 322d, where it is determined whether or not the index i is less than 1.

If the determination at step 322d is negative, the control proceeds to step 322e, where the index i is decremented, and the control returns to step 322c.

If the determination at step 322d is affirmative, that is, if the latest low byte RVC(L) is different from all of the previous ones RVCL(i), the control proceeds to step 322f, where the index i is set to "1".

At step 322g, it is determined whether or not the index i is greater than "$i_{max}$", and if the determination is negative, the control proceeds to step 322h.

At step 322h, the shifting process for RVCL(i) is executed based on the following equation.

$$RVCL(i) \leftarrow RVCL(i+1)$$

Where, RVCL is the array to store the previous variable codes.

At step 322j, the index i is incremented and the control returns to step 322g.

If the determination at 322g is affirmative, the control proceeds to step 322k, where the final shifting process is executed based on the following equation.

$$RVCL(i_{max}) \leftarrow RVC(L)$$

At step 3221, the received key word RKW is calculated based on the inverse function of the predetermined function, that is, the addition of the high byte RVC(H) and the low byte RVC(L).

$$RKW=RVC(H)+RVC(L)$$

If the determination at step 322c is affirmative, the control proceeds to step 322m, where a dummy received key word RKW is calculated based on a function different from the inverse function of the predetermined function (for example, the subtraction the low byte RVC(L) from the high byte RVC(H)).

$$RKW=RVC(H)-RVC(L)$$

According to the second embodiment, the decoding of the key word can be prevented when the start of the engine is repeated without interrupting of the electrical power to the automobile.

According to the second invention, however, the data stored in the memory 133 are destroyed when the antitheft apparatus is disconnected from the battery by a thief.

In this case, the processing to reject the duplicate key word is not sufficient, that is, the antitheft probability is decreased, because it is very rare that the latest low byte of the variable code agrees with any one of the data, that is, any one of the previous low bytes of the variable codes when the memory has been reset by a disconnection.

In order to solve the above-mentioned problem, the third embodiment has a mirror check function for checking whether or not the data stored in the memory 133 has been destroyed.

Figure 6:
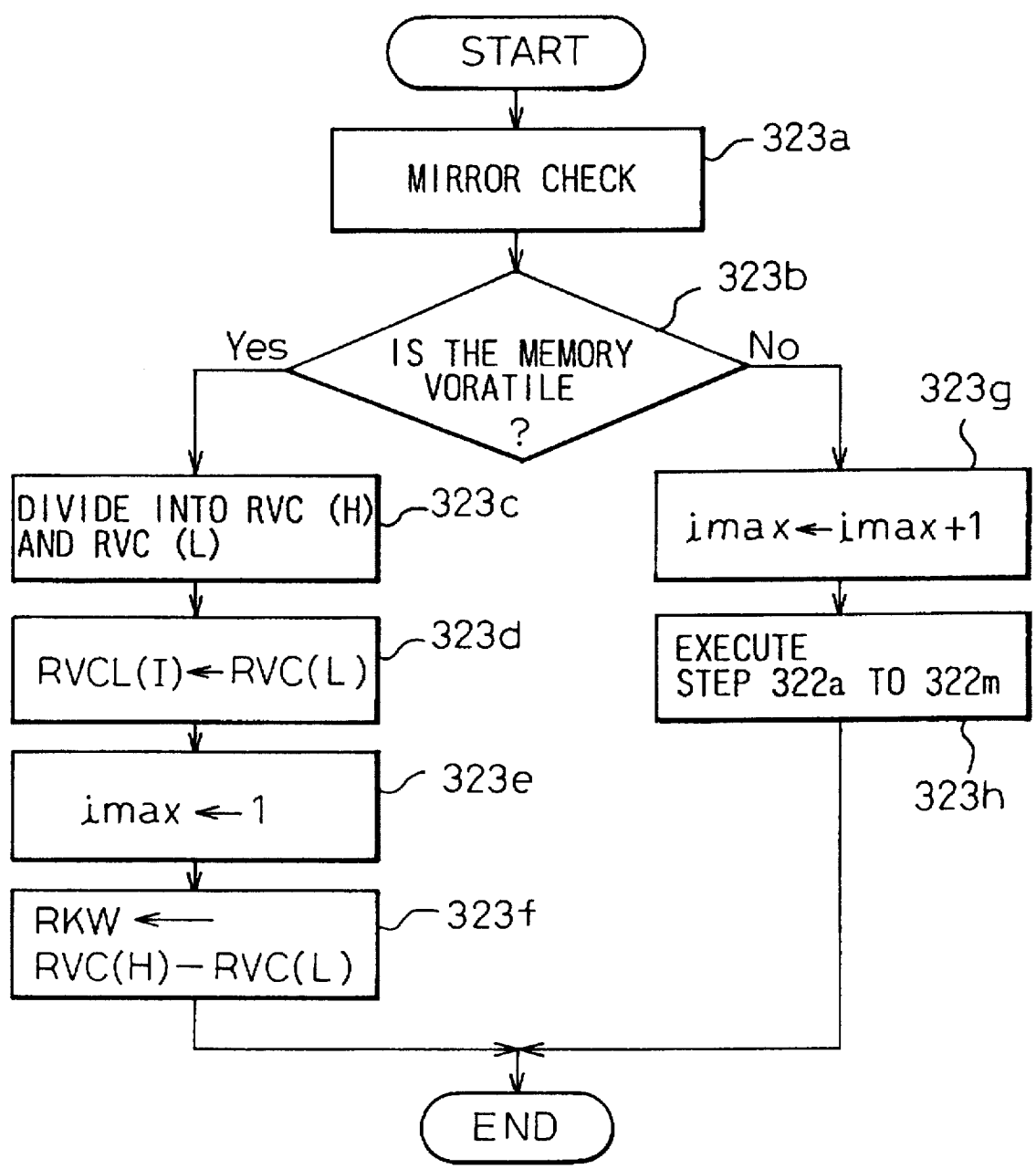
FIG. 6 is a flowchart of the third key word decoding routine.

FIG. 6 is a detailed flowchart of the third received key word processing executed at step 32 of the operation inhibiting routine in the third embodiment.

At step 323a, the mirror check is executed for checking whether or not the data stored in the memory 133 has been destroyed.

Note, the mirror check defines that data stored in the specific address of the volatile memory 133 are compared with the data stored in a nonvolatile memory (not shown), and the volatile memory is determined to be disconnected if an agreement is not detected.

If the determination at step 323b is affirmative, that is, if the antitheft apparatus has been once disconnected from the battery, the control proceeds to step 323c, where the received variable code RVC is divided into the high byte RVC(H) and the low byte RVC(L).

At step 323d, the low byte RVC(L) is stored in the RVCL(1) of the memory 133.

At step 323e, the maximum "$i_{max}$" of the index i is set to "1".

At step 323f, a dummy received key word is calculated based on a different function from the inverse function, for example, the subtraction the lower part RCV(L) from the higher part RVC(H), and this routine is terminated.

$$RKW=RVC(H)-RCV(L)$$

If the determination at step 323b is negative, the control proceeds to step 323g, where the maximum "$i_{max}$" of the index i is incremented, and this routine is terminated after the second received key word processing shown in FIG. 5 is executed.

According to the third embodiment, the first starting of the engine is inhibited when the destruction of the data stored in the memory 133 is detected, and the antitheft probability can be improved when the antitheft apparatus is disconnected from the battery.

According to the first to the third embodiments, however, it is not so difficult to decode the key word, because the key word is fixed. If the key word is decoded, the engine can be started by a code generator which can generates a variable code including the key word. Thus the antitheft probability cannot be sufficiently improved.

According to the fourth to eighth embodiments, the antitheft apparatus transmits a variable code from the engine ECU 13 to the immobilizer ECU 12, returns a return variable code which is calculated based on the predetermined key function in the immobilizer ECU 12, and controls a starting of the engine in accordance with an agreement of the return variable code with a reference variable code calculated in the engine ECU 13. Therefore, the antitheft probability can be sufficiently improved.

A second serial transmission line 142 which connects the communication interface 134 of the engine ECU 13 which functions as a transmitter with the communication interface 125 of the immobilizer ECU 12 which functions as a receiver, is additionally provided.

Figure 7:
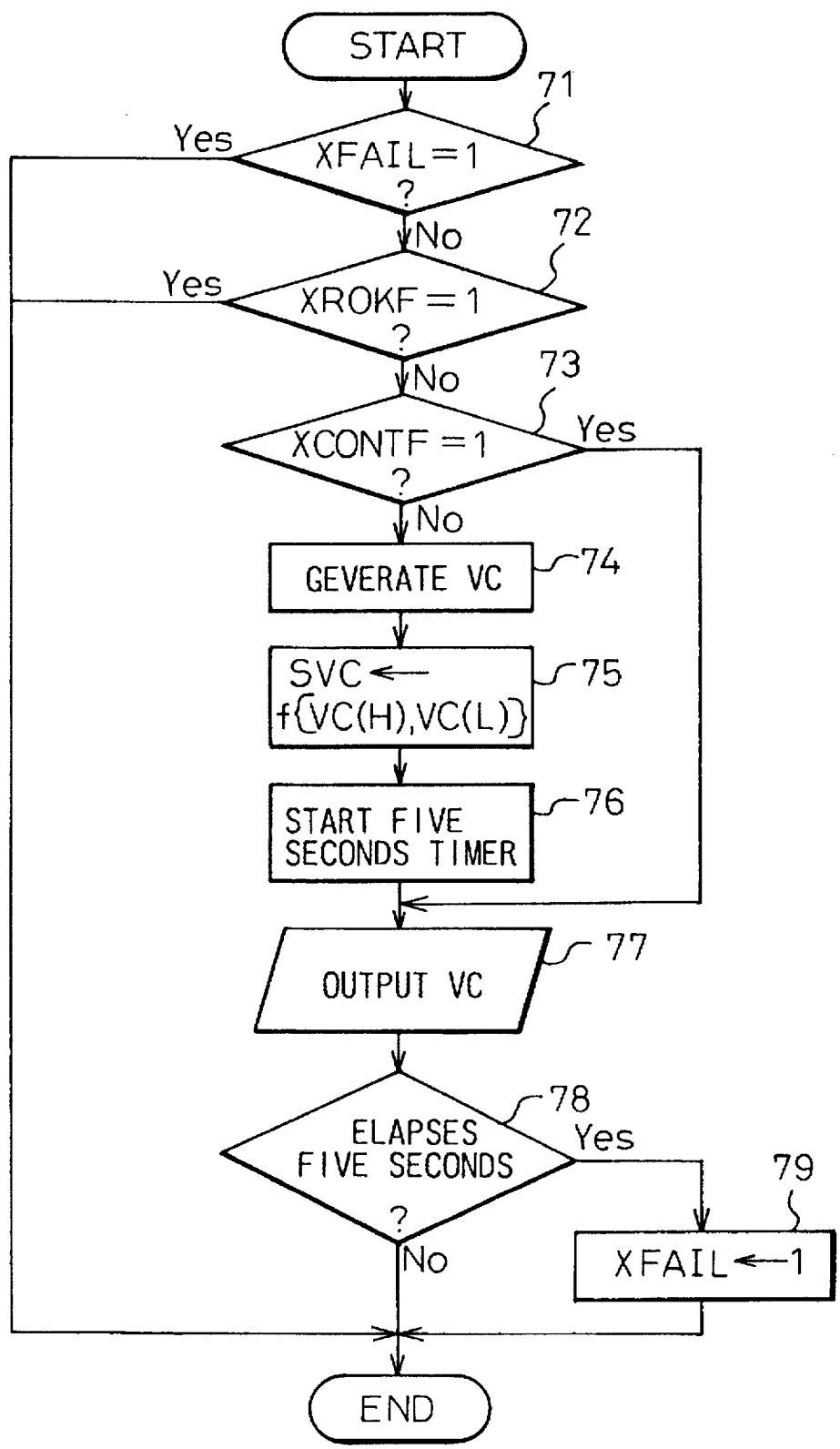
FIG. 7 is a flowchart of the first variable code transmitting routine.

FIG. 7 is a flowchart of the first variable code transmitting routine executed at every predetermined interval.

Note, flags XROKF, XCONF and XFAIL, explained hereafter, are reset at the initial state. The reason why the flag XFAIL is used and its reset timing are explained in the seventh embodiment.

At step 71, it is determined whether or not the flag XFAIL to inhibit a starting of the engine is set to "1", that is, whether or not a starting of the engine has been already inhibited.

If the determination at step 71 is affirmative, this routine is directly terminated.

If the determination at step 71 is negative, the control proceeds to step 72, where it is determined whether or not the flag XROKF to inhibit transmission/reception between the immobilizer ECU 12 and the engine ECU 13 is set to "1", that is, whether or not transmission/reception has been already inhibited. Note, the reason why the flag XROKF is used is explained in the eighth embodiment.

If the determination at step 72 is affirmative, this routine is directly terminated.

If the determination at step 72 is negative, the control proceeds to step 73, where it is determined whether or not the flag XCONTF to inhibit a renewal of the variable code is set to "1", that is, a renewal of the variable code has been already inhibited.

If the determination at step 73 is negative, the control proceeds to step 74, where a variable code, which comprises of a high byte and a low byte each byte thereof is generated at random, is composed.

At step 75, a reference variable code SVC is calculated based a predetermined key function f(•) of a two digits number VC(H) and a two digits number VC(L), and the control proceeds to step 76.

$$SVC=f\{VC(H), VC(L)\}$$

For example, if the predetermined key function is multiplication, the reference variable code SVC is determined from the following equation.

$$SVC=VC(H) \times VC(L)$$

Note, the key function is not limited to a mere multiplication, and may be any function combined with the four rules of arithmetic or the logical operations.

At step 76, a five seconds timer is started, and the control proceeds to step 77.

If the determination at step 73 is affirmative, the control directly proceeds to step 77 without modifying a variable code.

At step 77, the variable code VC is transmitted on the second serial transmission line 142 through the communication interface 134 every predetermined interval (for example, 100 milliseconds).

At step 78, it is determined whether or not the five seconds timer has counted up, and this routine is directly terminated if the determination at step 78 is negative.

If the determination at step 78 is affirmative, the control proceeds to step 79, where the flag XFAIL to inhibit a starting of the engine is set to "1", and this routine is terminated.

Figure 8:
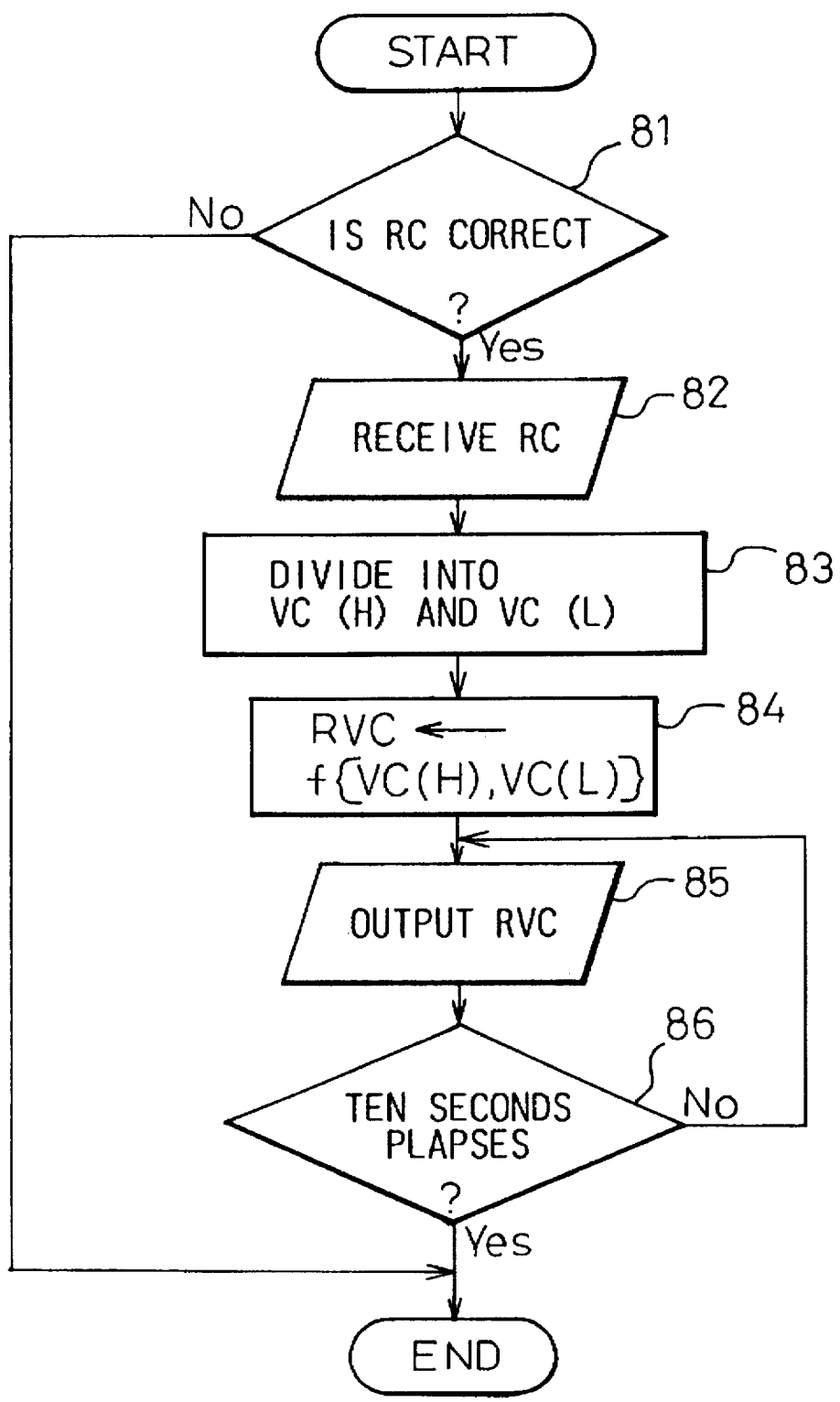
FIG. 8 is a flowchart of the first variable code processing routine.

FIG. 8 is a flowchart of the first variable code processing routine executed in the immobilizer ECU 12 of the antitheft apparatus according to the fourth embodiment every time the variable code VC transmitted from the engine ECU 13 is received.

At step 81, it is determined whether or not the identification code transmitted from the transmitter 111 installed in the ignition key 11 agrees with the predetermined identification code RC.

If the determination at step 81 is negative, that is, if an incorrect identification code is received or no identification code is received, this routine is directly terminated. Therefore, a starting of the engine is inhibited.

If the determination at step 81 is affirmative, the control proceeds to step 82, where the variable code VC transmitted from the engine ECU 13 is received.

At step 83, the received variable code VC is divided into the high byte VC(H) and the lower byte VC(L), and a returning variable code RVC is calculated using the predetermined key function.

$$RVC=f\{VC(H), VC(L)\}$$

If the predetermined key function is multiplication, the return variable code is calculated from the following equation.

$$RVC=VC(H) \times VC(L)$$

At step 85, the return variable code RVC is transmitted on the serial communication cable 141. At step 86, it is determined whether or not 10 seconds has elapsed, and the control returns to step 85 if the determination is negative.

If the determination is affirmative, this routine is terminated.

Figure 9:
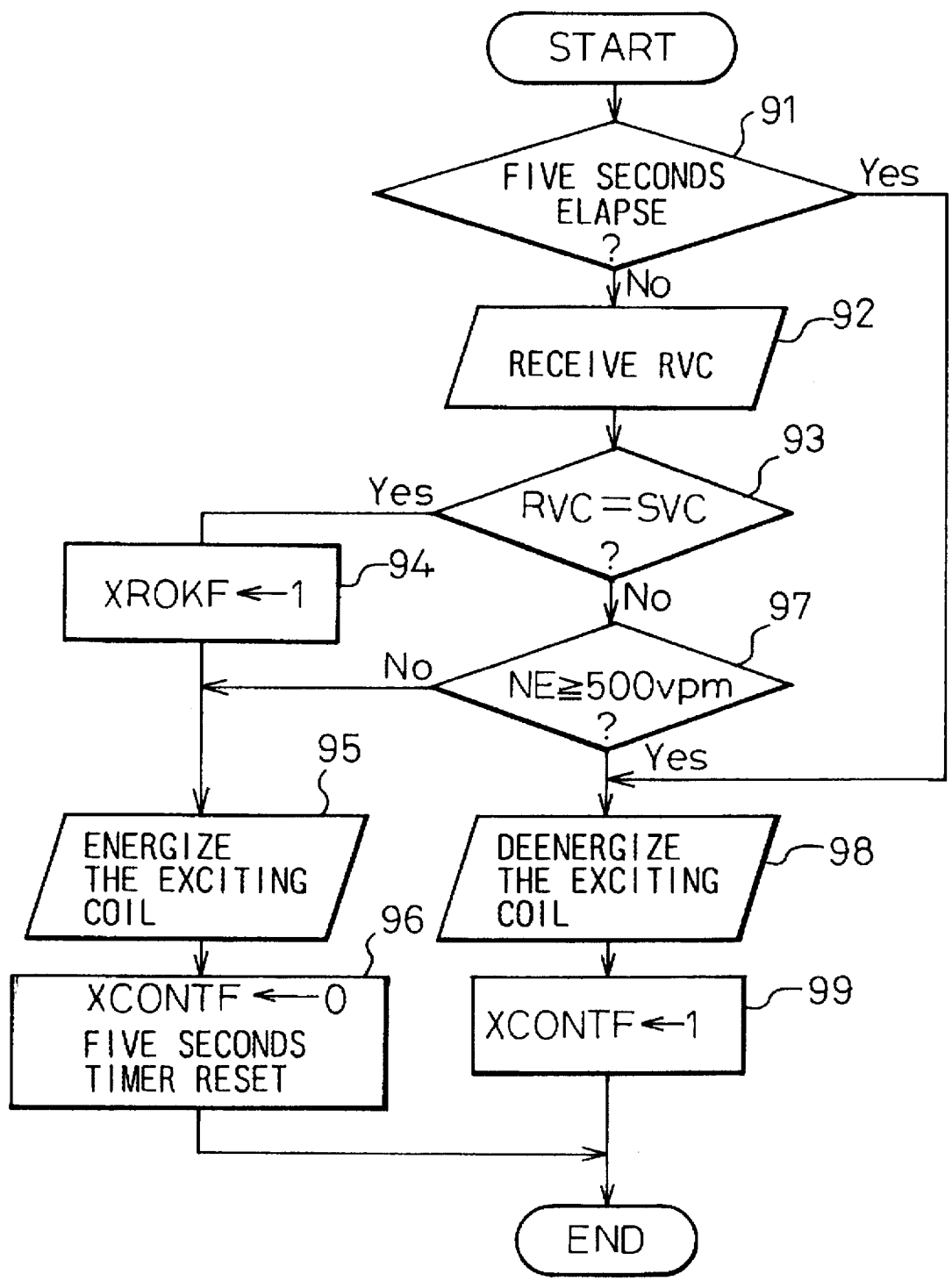
FIG. 9 is a flowchart of the first variable code receiving routine.

FIG. 9 is a flowchart of the first variable code receiving routine executed in the antitheft apparatus according to the fourth embodiment, and is executed simultaneously with the first variable code transmitting routine shown in FIG. 7.

At step 91, it is determined whether or not the five seconds timer has counted up, and the control directly proceeds to step 98 if the determination is affirmative.

If the determination at step 91 is negative, the control proceeds to step 92, where the return variable code transmitted from the immobilizer ECU 12 is fetched.

At step 93, it is determined whether or not the return variable code RVC agrees with the reference variable code SVC.

If the determination at step 93 is affirmative, the control proceeds to step 94, where the flag XROKF to inhibit the transmission/reception is set to "1", and the control proceeds to step 95.

At step 95, the exciton coil 154 of the relay 153 is excited to allow the supply of electric power to the fuel supply system 152.

The control proceeds to step 96, the variable code renewing flag XCONTF and the five seconds timer are reset to generate a new variable code, and the routine is terminated.

If the determination at step 93 is negative, the control proceeds to step 97, where it is determined whether or not the engine speed is higher than the predetermined speed (for example, 500 rpm), that is, whether or not a starting of the engine is completed.

If the determination at step 97 is negative, the control proceeds to step 95 to allow starting of the engine.

If the determination at step 97 is affirmative, the control proceeds to step 98, where the exciton coil 154 of the relay 153 is deenergized to inhibit a second starting of the engine. At step 99, the variable code renewing flag XCONTF is set to "1" to inhibit a renewing of the variable code, and this routine is terminated.

Note, the antitheft apparatus according to the fourth embodiment may use the key word as the first embodiment instead of the key function.

Figure 10:
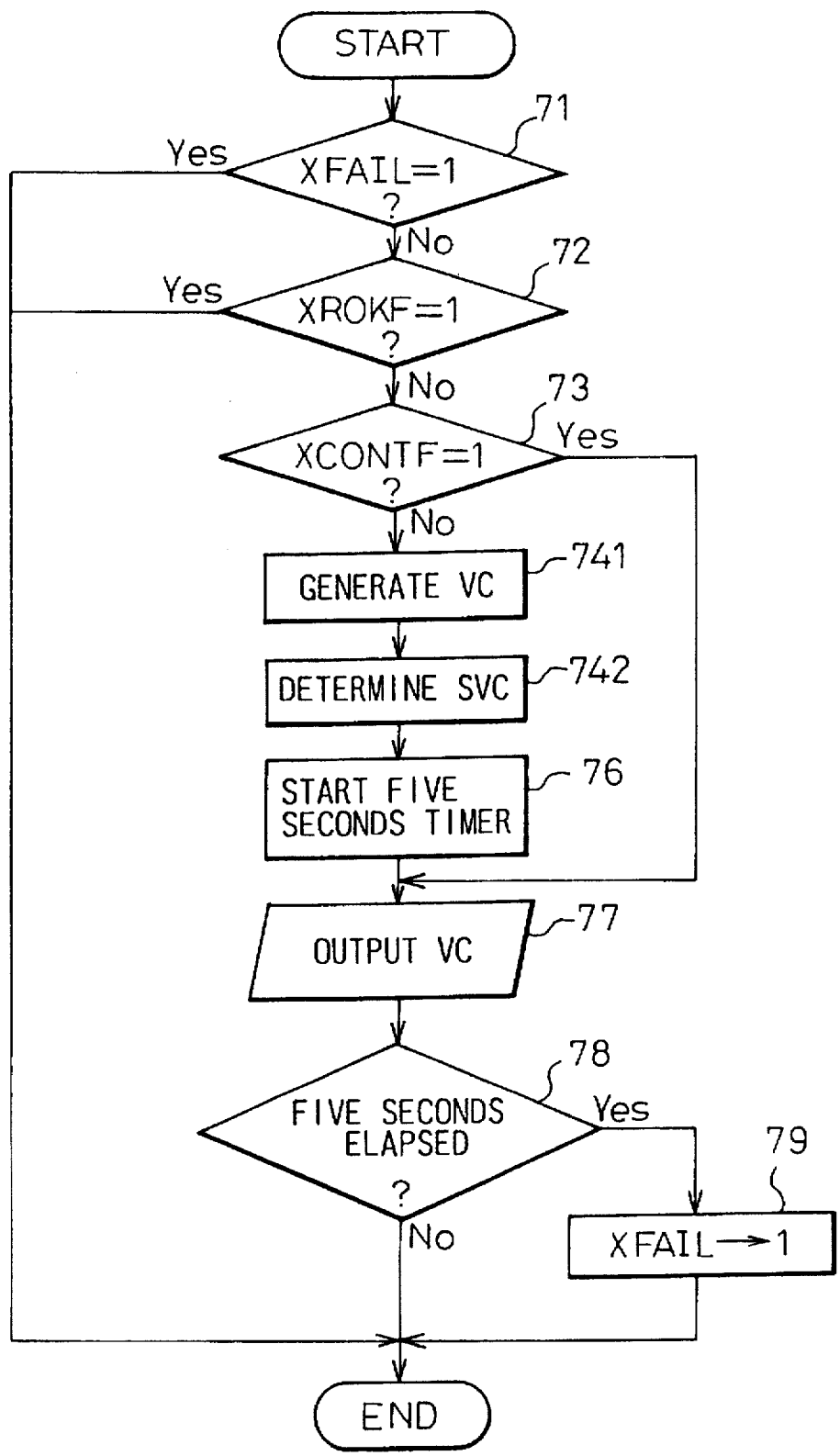
FIG. 10 is the first variable code transmitting routine when the key word is used.

FIG. 10 is a flowchart of the first variable code transmitting routine which uses a key word. Note, the same processes as in FIG. 7 have the same step number.

At step 71, it is determined whether or not the flag XFAIL to inhibit a starting of the engine is set to "1", that is, whether or not a starting of the engine has already been inhibited.

If the determination at step 71 is affirmative, this routine is directly terminated.

If the determination at step 71 is negative, the control proceeds to step 72, where it is determined whether or not the flag XROKF to inhibit transmission/reception is set to "1", that is, whether or not transmission/reception has been already inhibited. Note, the reason why the flag XROKF is used is explained in the eighth embodiment.

If the determination at step 72 is affirmative, this routine is directly terminated.

If the determination at step 72 is negative, the control proceeds to step 73, where it is determined whether or not the flag XCONTF to inhibit a renewal of the variable code is set to "1", that is, a renewal of the variable code has been already inhibited.

If the determination at step 73 is negative, the control proceeds to step 741, where a variable code VC, that is, a single byte number, is generated at random.

At step 742, a reference variable code SVC, that is, a single byte number is calculated based the variable code VC and a predetermined key word by the same processing as the first embodiment.

At step 76, a five seconds timer is started, and the control proceeds to step 77.

If the determination at step 73 is affirmative, the control directly proceeds to step 77 without modifying a variable code.

At step 77, the variable code VC is transmitted on the second serial transmission cable 142 though the communication interface 134 every predetermined interval (for example, 100 millisecond).

At step 78, it is determined whether or not the five seconds timer has counted up, and this routine is directly terminated if the determination at step 78 is negative.

If the determination at step 78 is affirmative, the control proceeds to step 79, where the flag XFAIL to inhibit a starting of the engine is set to "1", and this routine is terminated.

Figure 11:
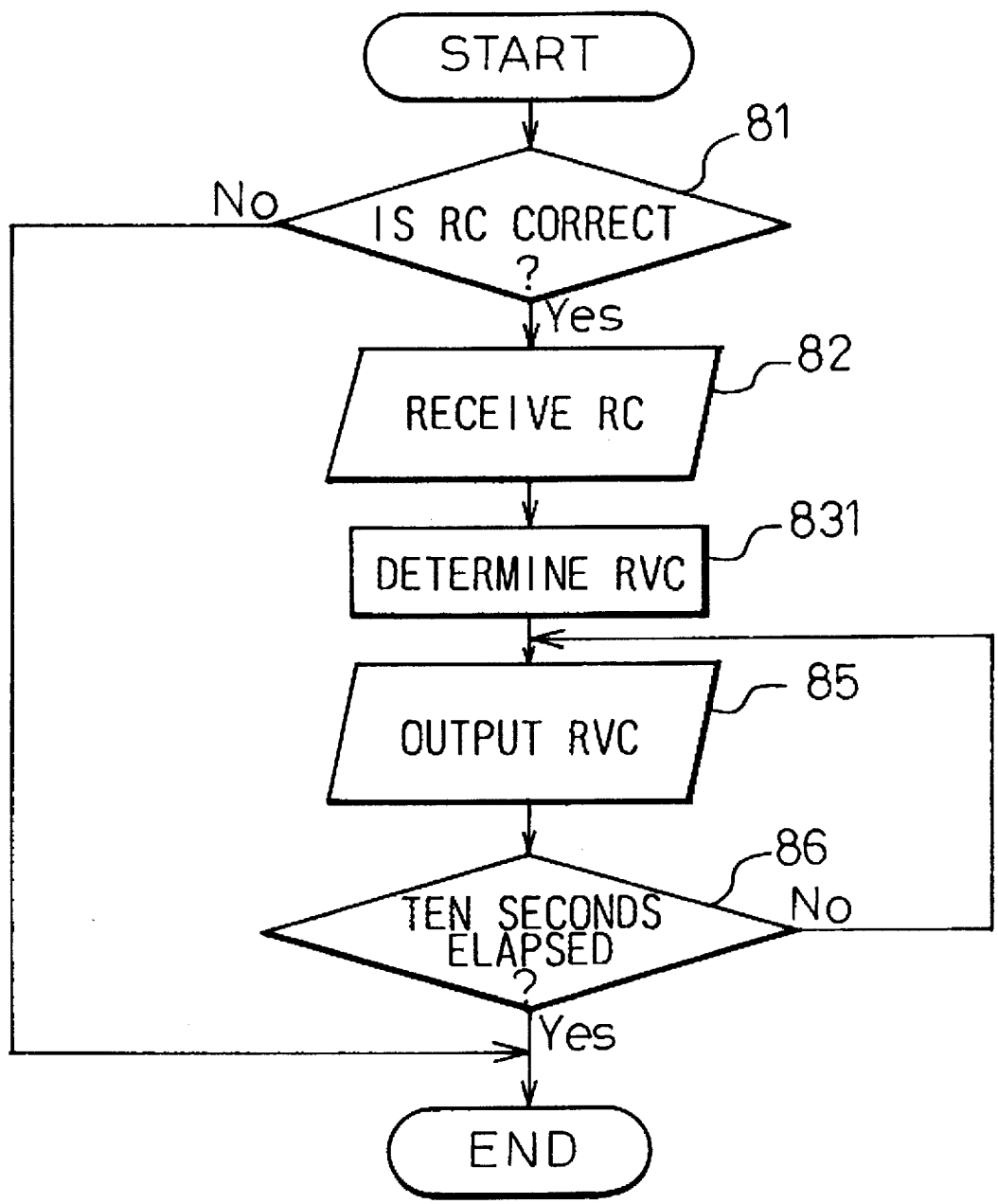
FIG. 11 is a flowchart of the first variable code processing routine when the key word is used.

FIG. 11 is a flowchart of the first variable code processing routine which uses a key word executed every time when the variable code VC transmitted from the engine ECU 13 is received.

At step 81, it is determined whether or not the identification code transmitted from the transmitter 111 installed in the ignition key 11 agrees with the predetermined identification code RC.

If the determination at step 81 is negative, that is, if an incorrect identification code is received or no identification code is received, this routine is directly terminated. Therefore, a starting of the engine is inhibited.

If the determination at step 81 is affirmative, the control proceeds to step 82, where the variable code VC transmitted from the engine ECU 13 is received.

At step 831, a return variable code RVC, that is, single byte number is calculated based on the received variable code and a predetermined key word.

At step 85, the return variable code RVC is transmitted on the serial communication line 141. At step 86, it is determined whether or not 10 seconds has elapsed, and the control returns to step 85 if the determination is negative.

Note, the first variable code receiving routine can be used without any modification, in this case.

According to the fourth embodiment, however, the variable code is not renewed if the electric power to the automobile is interrupted, that is, the ignition switch is turned off.

Therefore, the fourth embodiment has a weak point, that is, it is possible to decode the variable code and to start the engine if starting of the engine is repeated without turning off of the ignition switch.

The fifth embodiment has a function of inhibiting to start the engine if a variable code, detected at the latest instance of electric power supply, agrees with one of the variable codes detected at the previous instance of electric power supply in order to solve the above-mentioned problem.

In the fifth embodiment, fuel supply to the engine is interrupted if the same return variable codes are continuously received.

Figure 12:
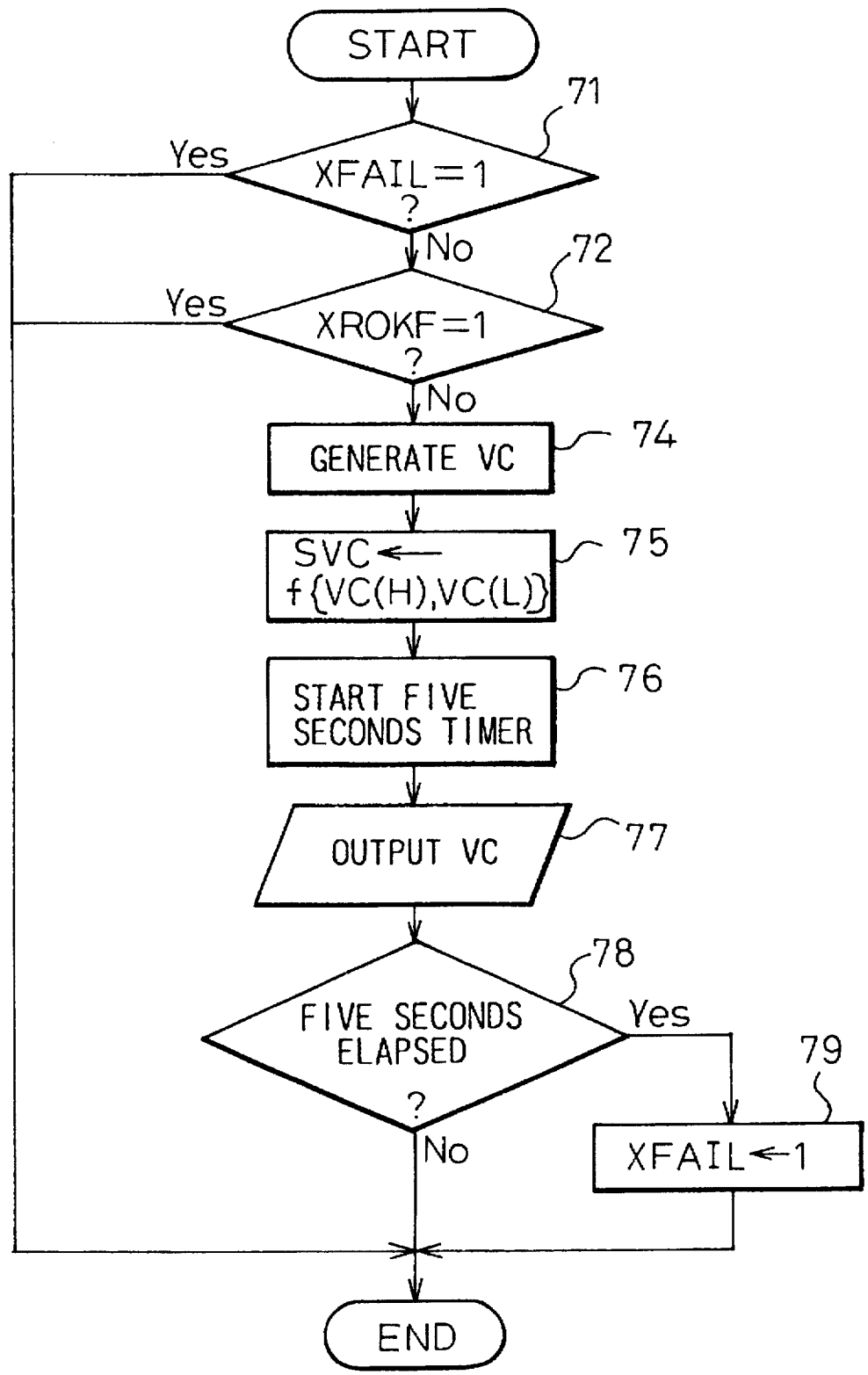
FIG. 12 is a flowchart of the second variable code transmitting routine.

FIG. 12 is a flowchart of the second variable code transmitting routine executed in the engine ECU 13 according to the fifth embodiment, and this routine is same as the first variable code transmitting routine except that step 73 is deleted.

Therefore, the variable code is renewed every transmission.

Figure 13:
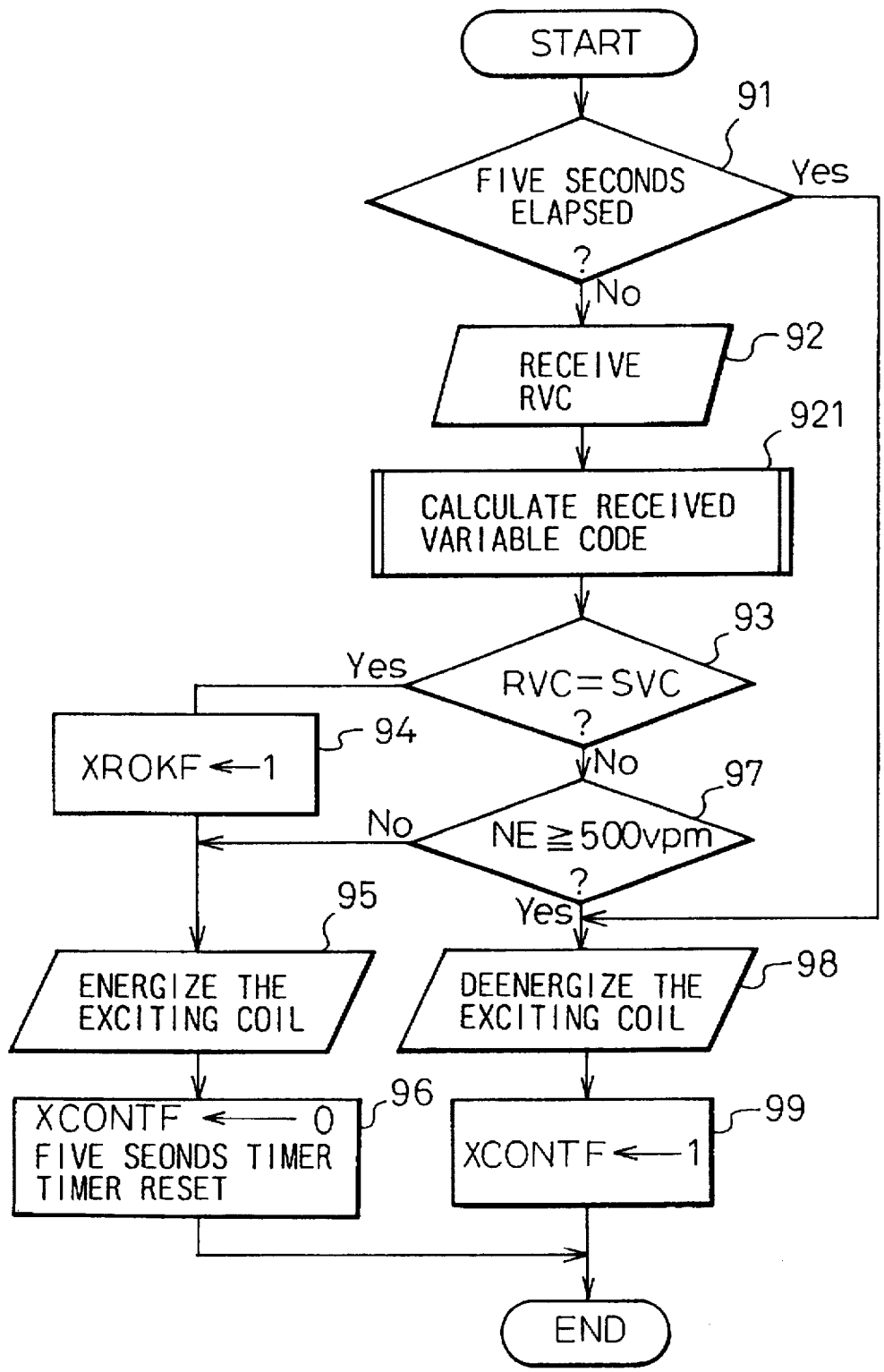
FIG. 13 is a flowchart of the second variable code receiving routine.

FIG. 13 is a flowchart of the second variable code receiving routine which has step 921, that is, a step for calculating the variable code is added between step 92 and step 93 of the first variable code receiving routine.

Figure 14:
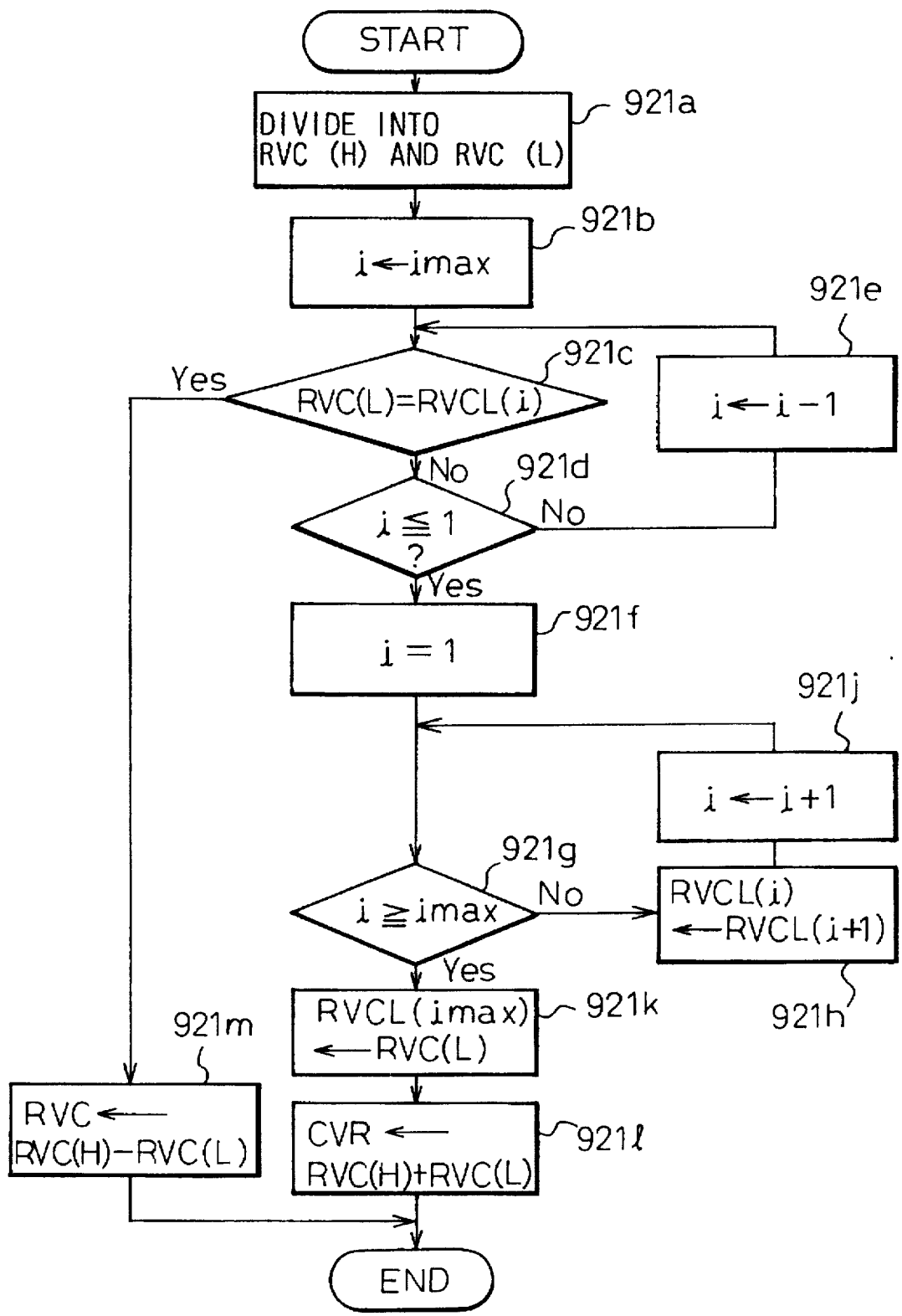
FIG. 14 is a flowchart of the variable code processing routine.

FIG. 14 is a flowchart of the variable code calculating routine which is basically the same as the second received key word calculating routine executed in the second embodiment.

At step 921a, the received variable code RVC is divided into the high byte RVC(H) and the low byte RVC(L).

At step 921b, the index i which denotes the number of the variable codes to be checked is set to the predetermined maximum value "$i_{max}$".

At step 921c, it is determined whether or not the low byte RVC(L) of the received variable code agrees with any one of the low byte RVCL(i) of the previously received variable codes stored in the memory 133.

If the determination at 921c is negative, the control proceeds to step 921e, where it is determined whether or not the index i is less than "1".

If the determination at 921c is affirmative, the control proceeds to step 921e, where the index i is incremented, and the control returns to step 921c.

If the determination at step 921d is affirmative, that is, if the low byte RVC(L) of the latest received variable code is different from any one of the low bytes RVCL(i) of the previously received variable codes, the control proceeds to step 921f, where the index i is set to "1".

At step 921g, it is determined whether or not the index i is larger than "$i_{max}$", and the control proceeds to step 921h if the determination is negative.

At step 921h, a shifting process is executed based on the following equation.

$$RVCL(i) \leftarrow RVCL(i+1)$$

At step 921j, the index is incremented, and the control returns to step 921g.

If the determination at 921g is affirmative, the final shifting process is executed using the following equation.

$$RVCL(i_{max}) \leftarrow RVCL(i+1)$$

At step 921l, the return variable code RVC is calculated by the addition of the high byte RVC(H) and the low byte RVC(L), that is, the inverse function of the predetermined function.

$$RVC=RVC(H)+RVC(L)$$

If the determination at step 921c is affirmative, the control proceeds step 921m, where the dummy return variable code RVC is calculated by subtraction of the low byte RVC(L) from the high byte RVC(H), that is, a function which is different from the inverse function.

$$RVC=RVC(H)-RVC(L)$$

Note, the first variable code processing routine shown in FIG. 9 is executed to process the variable code in the fifth embodiment.

In the fifth embodiment, if the agreement of the return variable code with the reference variable code is not detected for 5 seconds after the engine speed once rises over 500 rpm, the fuel supply is interrupted, and the engine cannot be started while the antitheft apparatus is disconnected from the battery.

The sixth embodiment aims to solve the above-mentioned problem, and can transmit the variable code again if the agreement of the return variable code with the reference variable code is not detected for 5 seconds.

Figure 15:
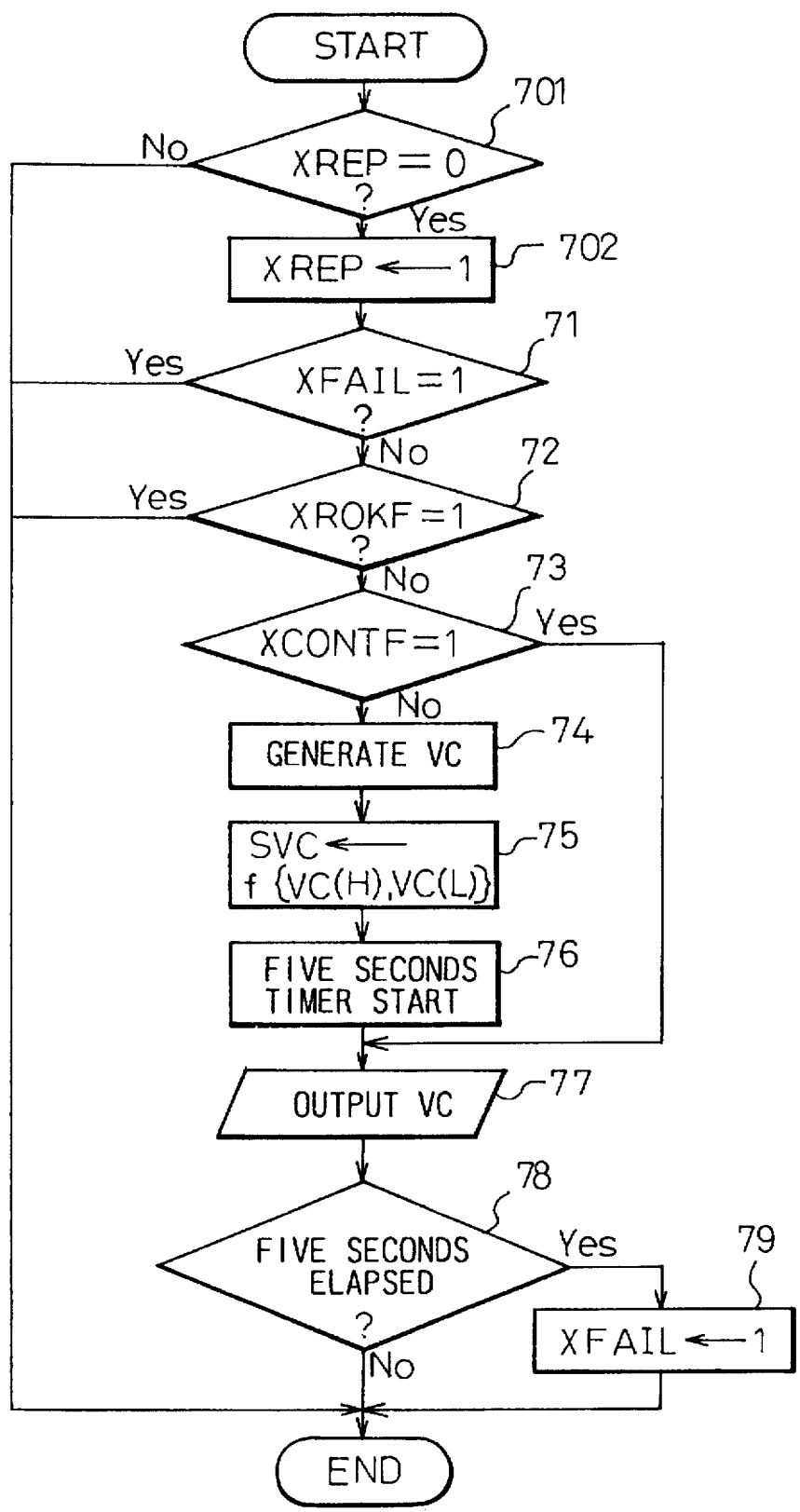
FIG. 15 is a flowchart of the third variable code transmitting routine.

FIG. 15 is a flowchart of the third variable code transmitting routine which has two steps 701 and 702 added to the first variable code transmitting routine.

At step 701, it is determined whether or not the retransmitting flag XREP is "0".

Note, the retransmitting flag XREP is reset in the initial routine (not shown).

If the determination at step 701 is affirmative, the control proceeds to step 702, where the retransmitting flag XREP is set to "1", and the control proceeds to step 71, where the variable code is regenerated and retransmitted.

If the determination at step 701 is negative, this routine is directly terminated.

In the fourth to sixth embodiments, the reset operation for allowing a restart of the engine must be executed at the maintenance factory.

The seventh embodiment aims to solve the above-mentioned problem, and the reset operation is resetting the data stored in the memory by disconnecting it from the battery.

Figure 16:
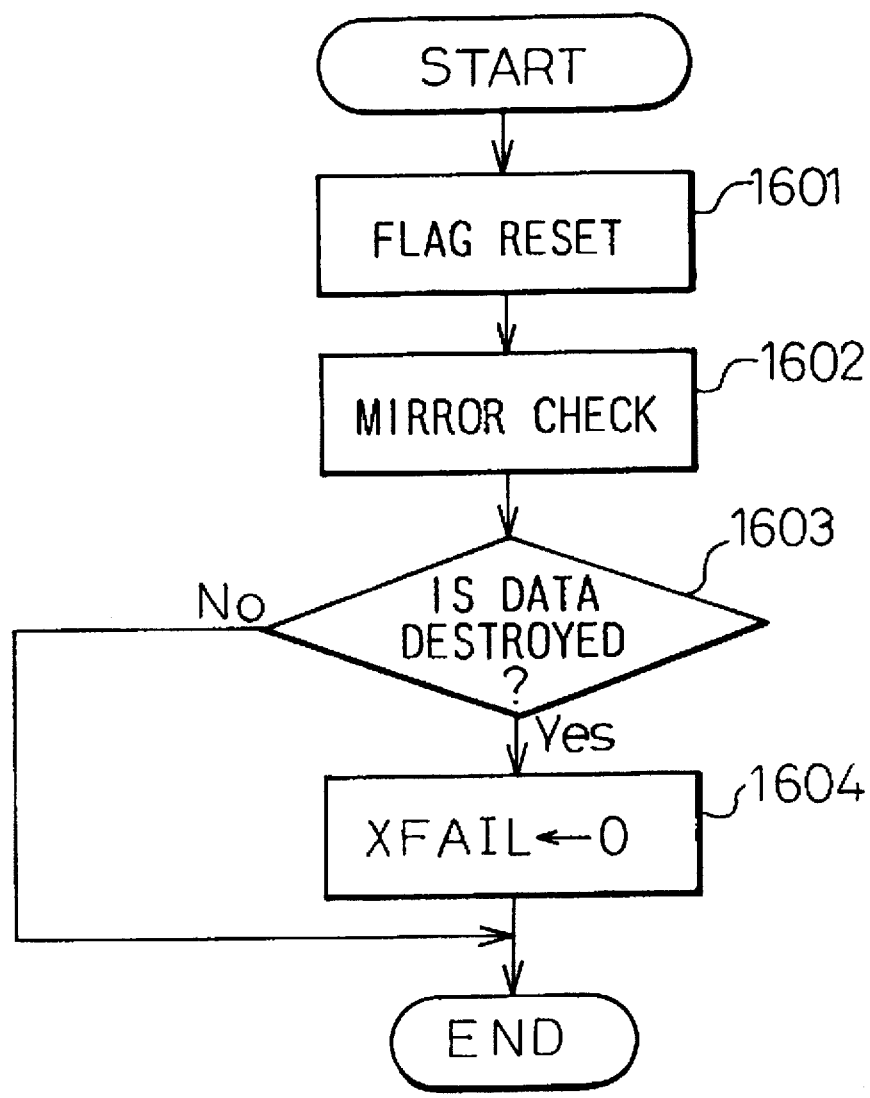
FIG. 16 is a flowchart of the initializing routine.

FIG. 16 is a flowchart of the initial routine executed in the engine ECU 13 according to the seventh embodiment, and every power on reset.

At step 1601, all flags, for example, the variable code renewing routine XCONTF are reset, and the control proceeds to step 1602.

At step 1602, the mirror check for the memory 133 is executed, and it is determined whether or not the data stored in the memory are destroyed by disconnecting the memory 133 from the battery (not shown).

If the determination at step 1603 is affirmative, the control proceeds to step 1604, where the ignition inhibiting flag XFAIL is reset, and this routine is terminated.

If the determination at step 1603 is negative, this routine is directly terminated.

In the seventh embodiment, the first variable code transmitting routine, the first variable code processing routine and the first variable receiving routine are executed.

According to the fourth to the seventh embodiments, a person other than the car owner may possibly decode the key function, because the variable code is continuously transmitted after the agreement between the return variable code and the reference variable code is detected.

The eighth embodiment aims to solve the above-mentioned problem, and interrupts transmitting of the variable code after the agreement of the return variable code with the reference variable code is once detected.

For this purpose, a first variable code transmission interrupting flag XROKF shown in FIG. 7 is used.

Figure 17:
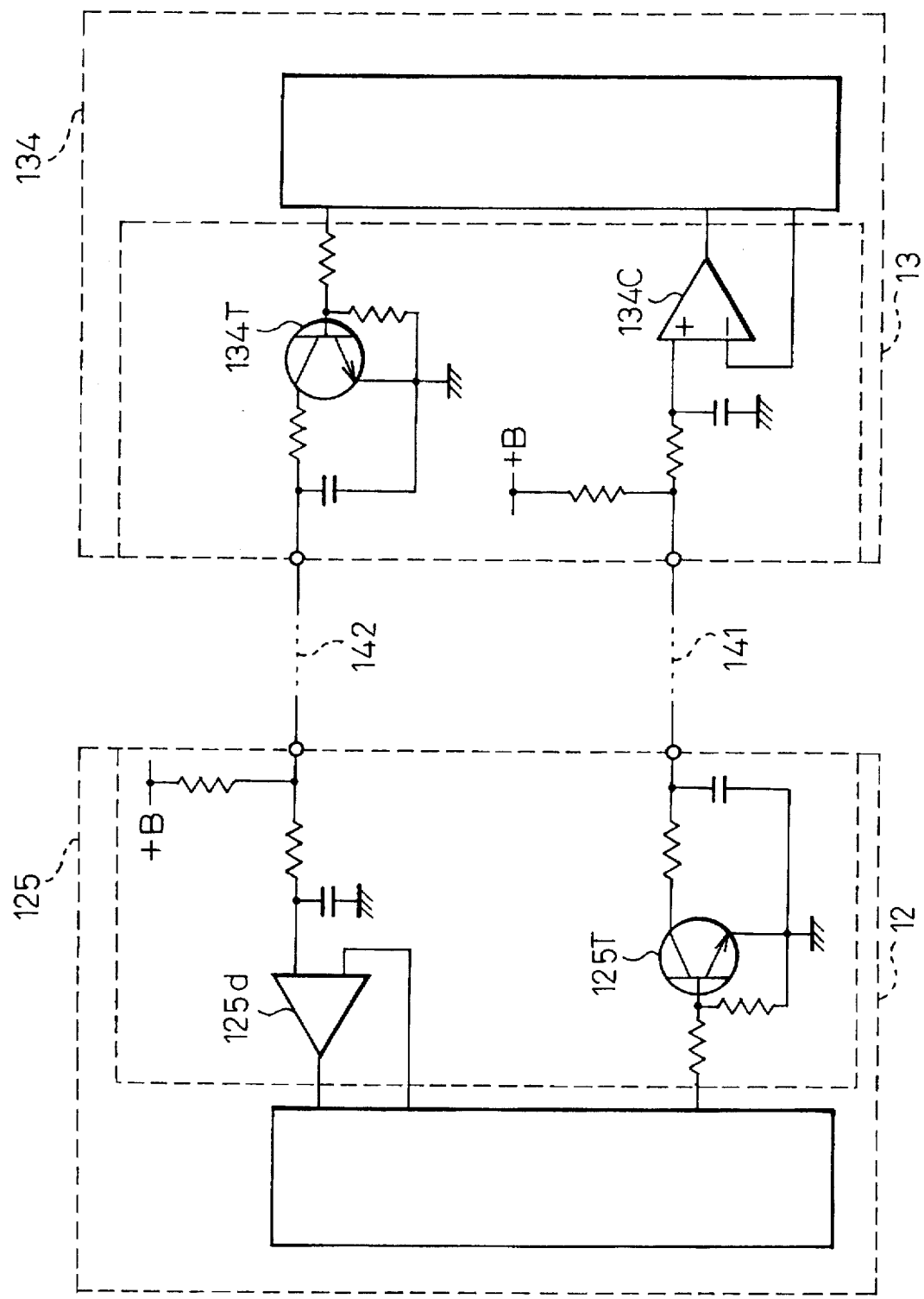
FIG. 17 is a circuit diagram of a communication interface.

A serial transmission rule between the engine ECU and the immobilizer ECU of the antitheft apparatus, according to this invention, is not limited and the rule shown in FIG. 17 may be used.

FIG. 17 is one example of a circuit diagram of the communication interface.

In the transmission line 141 used for the transmission from the immobilizer ECU 12 to the engine ECU 13, the transistor 125T is controlled by the output signal generated in the immobilizer ECU 12.

The voltage at the positive input terminal of the comparator 134C installed in the engine ECU 13 varies in accordance with the output of the transistor 125T and is discriminated between "H" level and "L" level by comparing with the reference voltage and is fetched into the engine ECU 13.

FIG. 18 shows one example of the frame structure of the communication message which is composed of the high byte and the low byte.

Each byte is composed of two digits, and each digit thereof is composed of four bits.

The eight continuous "L" level bits are applied as the starting signal for message communication. One "H" level bit is applied as the stop signal, and one "L" level bit is applied as the start signal.

I claim:

1. An antitheft apparatus for an automobile comprising:

an identification code transmitting means for transmitting an initial identification code;

an immobilizing means for transmitting a variable code which is comprised of a plurality of blocks, wherein each of said plurality of blocks has a plurality of bits, further wherein at least one of said plurality of blocks is generated at random when electricity is supplied to the automobile and the remainder of said plurality of blocks are generated based upon a predetermined function of said at least one of said plurality of blocks and a predetermined key word for a predetermined period after electricity is supplied to the automobile, if the initial identification code and a predetermined identification code agree; and a start inhibiting means for inhibiting the starting of an engine if a key word, which is decoded based on the variable code transmitted from said immobilizing means and said predetermined key word disagree, for a predetermined period after electricity is supplied to the automobile.

2. An antitheft apparatus for an automobile according to claim 1, wherein said start inhibiting means further includes:

a storing means for storing at least one of said plurality of blocks of every variable code transmitted from said immobilizing means every time an engine starter is activated while electricity is continuously supplied to the automobile; and a duplicate code rejecting means for inhibiting the starting of the engine if agreement between at least one end of said plurality of blocks of a subsequently transmitted variable code corresponding to said at least one stored block of said previously transmitted variable codes and said at least one stored block of said previously transmitted variable codes is detected.

3. An antitheft apparatus for an automobile according to claim 2, wherein said storing means further includes:

a checking means for checking whether or not said at least one stored block has been destroyed when electricity is supplied to the automobile;

a restoring means for inhibiting the starting of the engine even though agreement between a key word which is encoded based on the variable code transmitted from said immobilizing means and said predetermined key word is detected when said checking means determines that said at least one stored block has been destroyed, and restoring said at least one of a plurality of blocks of a subsequently transmitted variable code in said storing means.

4. An antitheft apparatus for an automobile comprising:

an identification code transmitting means for transmitting an initial identification code;

a variable code transmitting means for transmitting a variable code which is comprised of a plurality of blocks, wherein each of said plurality of blocks has a plurality of bits and each of said plurality of blocks is generated at random, for a predetermined period after electricity is supplied to the automobile, and calculating a reference code which is determined as a predetermined function of said plurality of blocks of said variable code when electricity is supplied to the automobile and reaches a predetermined operating condition;

an immobilizing means for transmitting a return code which is calculated as a predetermined key function of said plurality of blocks of said variable code, if an agreement between said initial identification code and a predetermined identification code is detected; and a start inhibiting means for inhibiting the starting of an engine if an agreement between said return code transmitted from said immobilizing means and said reference code determined in said variable code transmitting means is not detected for a predetermined period after electricity is supplied to the automobile.

5. An antitheft apparatus for an automobile according to claim 4, wherein said start inhibiting means further includes:

a storing means for storing at least one of said plurality of blocks of every variable code transmitted from said immobilizing means every time electricity is supplied to the automobile; and a duplicate code rejecting means for inhibiting the starting of the engine if agreement between at least one of a plurality of blocks of a subsequently transmitted variable code corresponding to said at least one stored block of said previously transmitted variable code and said at least one stored block is detected.

6. An antitheft apparatus for an automobile according to claim 4, wherein said start inhibiting means further includes:

a retransmission command outputting means for outputting one retransmittion command to said variable code transmitting means if an agreement between said return code transmitted from said immobilizing means and said reference code determined in said variable code transmitting means is not detected for a predetermined period after electricity is supplied to the automobile.

7. An antitheft apparatus for an automobile according to claim 5, wherein said duplicate code rejecting means further includes:

a start allowing means for allowing the engine to start if the at least one block of said variable code stored in said storing means is reset after the starting of the engine has been once inhibited.

8. An antitheft apparatus for an automobile according to claim 4, wherein said variable code transmitting means further includes:

an interrupting means for interrupting the transmission of variable codes if an agreement between said returning code transmitted from said immobilizing means and said reference code determined in said variable code transmitting means is detected for a predetermined period after electricity is supplied to the automobile.

9. An antitheft method for an automobile comprising the steps of:

transmitting an initial identification code;

transmitting a variable code which is comprised of a plurality of blocks, wherein each of said plurality of blocks includes a plurality of bits, wherein at least one of said plurality of blocks is generated at random when electricity is supplied to the automobile and the remainder of the plurality of blocks thereof being determined as a predetermined function of said at least one plurality of blocks and a predetermined key word for a predetermined period after electricity is supplied to the automobile, if an agreement between the initial identification code and a predetermined identification code is detected; and inhibiting the starting of an engine if an agreement between a key word, which is decoded from the transmission variable code and said predetermined key word is not detected for a predetermined period after electricity is supplied to the automobile.

10. An antitheft method for an automobile according to claim 9, wherein said start inhibiting step further includes the steps of:

storing at least one block included in each transmitted variable code each time electricity is supplied to the automobile; and inhibiting to start an engine if agreement between a block of the latest transmitted variable code corresponding to said at least one block and at least one block stored at said storing step are detected in a plurality of times.

11. An antitheft method for an automobile according to claim 10, wherein said storing step further includes the steps of:

checking whether or not said at least one block stored, at said storing step has been destroyed;

inhibiting the starting of an engine even though agreement between a key word which is encoded from the latest transmitted variable code and said predetermined key word is detected when said checking means determines that at least one block has been destroyed, and restoring at least one block.

12. An antitheft method for an automobile comprising the steps of:

transmitting an initial identification code;

transmitting a variable code which is comprised of a plurality of blocks, wherein each of said plurality of blocks has a plurality of bits and is generated at random for a predetermined period after electricity is supplied to the automobile, and calculating a reference code which is determined as a predetermined function of said plurality of blocks of said variable code when electricity is supplied to the automobile and reaches a predetermined operating condition;

transmitting a return code which is calculated as a predetermined key function of said plurality of blocks of said variable code, if an agreement between the initial identification code and a predetermined identification code is detected; and inhibiting the starting of an engine if agreement between a key word, which is decoded from the transmitted variable code and said predetermined key word is not detected.

13. An antitheft method for an automobile according to claim 12, wherein said start inhibiting step further includes the steps of:

storing at least one block included in each variable code transmitted each time electricity is supplied to the automobile; and rejecting duplicate variable code for inhibiting the starting of an engine if agreement between a block of the latest transmitted variable code corresponding to said at least one block and at least one block stored at said storing step are detected a plurality of times.

14. An antitheft method for an automobile according to claim 13, wherein said start inhibiting step further includes the step of:

outputting one retransmittion command if agreement between said return code transmitted at said return code transmitting step and said reference code determined at said variable code transmitting step is not detected for a predetermined period after electricity is supplied to the automobile.

15. An antitheft method for an automobile according to claim 13, wherein said duplicate code rejecting step further includes the step of:

allowing an engine to start if the starting of the engine has been once inhibited and said at least one block of the return variable code stored at said storing means is reset.

16. An antitheft method for an automobile according to claim 12, wherein said variable code transmitting step further includes the step of:

interrupting the transmission of variable codes if agreement between said transmitted return code and said reference code is detected for a predetermined period after electricity is supplied to the automobile.

* * * * *